United States Statutory Invention Registration [19]

[11] Reg. Number: H173

Claborn et al. [43] Published: Dec. 2, 1986

[54] TEMPERATURE AND FREQUENCY COMPENSATED ARRAY BEAM STEERING UNIT

[75] Inventors: Kenneth D. Claborn; William C. Bailey, both of Baltimore, Md.

[73] Assignee: The United States of America as represented by the Secretary of the Army, Washington, D.C.

[21] Appl. No.: 859,283

[22] Filed: Apr. 30, 1986

[51] Int. Cl.[4] ..... H01Q 3/26; G01S 7/40

[52] U.S. Cl. ..... 342/372; 342/173

*Primary Examiner*—Stephen C. Buczinski
*Assistant Examiner*—Linda J. Wallace
*Attorney, Agent, or Firm*—Anthony T. Lane; Sheldon Kanars; John K. Mullarney

[57] ABSTRACT

Beam pointing errors and sidelobes resulting from temperature variations on the aperture and power divider of a series phased array antenna operating at a plurality of selected operating channel frequencies and having uniformly spaced elements are compensated for by placing a temperature sensor on both the aperture and power divider and converting the respective temperature outputs to digital signals which are fed to a digital beam steering unit. A pair of programmed memories are included in the beam steering unit which respond to an address or pointer corresponding to the digitized temperature values and the selected operating frequency to read out stored digitized beam steering phase gradients and feed phase corrections which are combined and sequentially applied at regular intervals to symmetrically located phase shifter pairs. A uniformly compensated beam is thereafter radiated at a predetermined phase angle.

21 Claims, 5 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

$$\phi = a_n = \frac{2\pi d n}{\lambda} \sin\theta$$

n = ELEMENT POS. NO.

TEMPERATURE AND FREQUENCY COMPENSATED ARRAY BEAM STEERING UNIT

STATEMENT OF GOVERNMENT RIGHTS

The Government has rights in this invention pursuant to Contract No. DAAK80-80-C-0035 ordered by the Department of the Army.

BACKGROUND OF THE INVENTION

This invention relates generally to phased array antennas and more particularly to the compensation of beam pointing errors resulting from frequency and temperature changes.

In airborne and ground based phased array antenna systems driven by a series-fed power divider and operating over a selected range of frequencies, beam pointing errors and undesired antenna sidelobes are known to be generated as a function of the expansion and contraction of the aperture as a function of temperature and more particularly over the range from −50° C. to +70° C. when operating at a predetermined frequency. Phased errors resulting from expansion and contraction of the manifold of the power divider are also known to exist as a result of temperature changes. Heretofore, compensation for these errors was accomplished by constructing the antenna components from relatively expensive material having a low temperature coefficient of expansion, a typical example being invar, an alloy of iron and nickel. This mechanical approach has been found to be relatively costly and, at most, an approximation.

Accordingly, it is an object of the present invention to provide an improvement in phased array antenna systems.

It is a further object of the invention to provide an improvement in the compensation for pointing angle errors introduced by dimensional changes of the antenna beam forming structure.

It is yet another object of the invention to provide electrical compensation for pointing errors and sidelobes due to temperature in a phased array antenna.

And it is still a further object of the invention to electronically shift the antenna beam forming angle to compensate for pointing angle errors and sidelobes introduced by dimensional changes of the phase antenna beam forming structure due to temperature changes when operated over a relatively large frequency band.

SUMMARY

Briefly, the foregoing and other objects of the invention are accomplished by a method and apparatus implemented in an array beam steering unit whereby beam pointing errors and sidelobes resulting from temperature variations on the aperture and power divider of a series-fed phased array antenna operating over a large range of frequencies are compensated for electronically. A temperature sensor is placed on both the aperture and power divider of the array which includes uniformly spaced elements. Temperature signals corresponding to the temperature of the aperture and power divider are converted to digital signals which are applied along with a digital signal corresponding to the selected operating frequency to digital circuit means which generate address pointers for respective non-volatile programmed memories which read out digitized beam steering phase gradients and feed phase corrections, respectively, which are summed and applied at regular intervals to symmetrically located phase shifters coupled to respective elements of the array in accordance with a predefined sequence.

BRIEF DESCRIPTION OF THE DRAWINGS

While the present invention is defined in the claims annexed to and forming a part of the specification, a better understanding can be had by reference to the following description when taken in conjunction with the accompanying drawings in which:

DETAILED DESCRIPTION OF THE INVENTION

Figure 1:
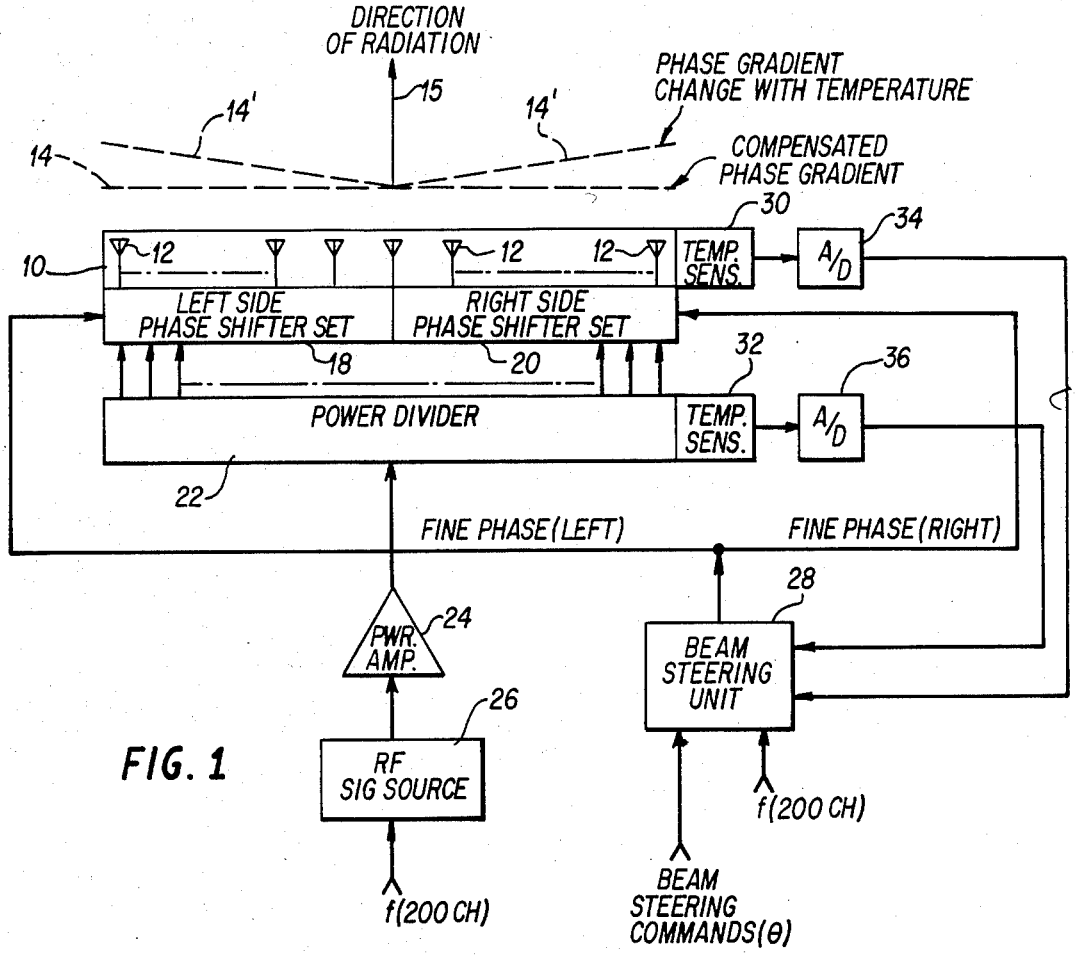
FIG. 1 is a block diagram generally illustrative of the subject invention.
Figure 2:
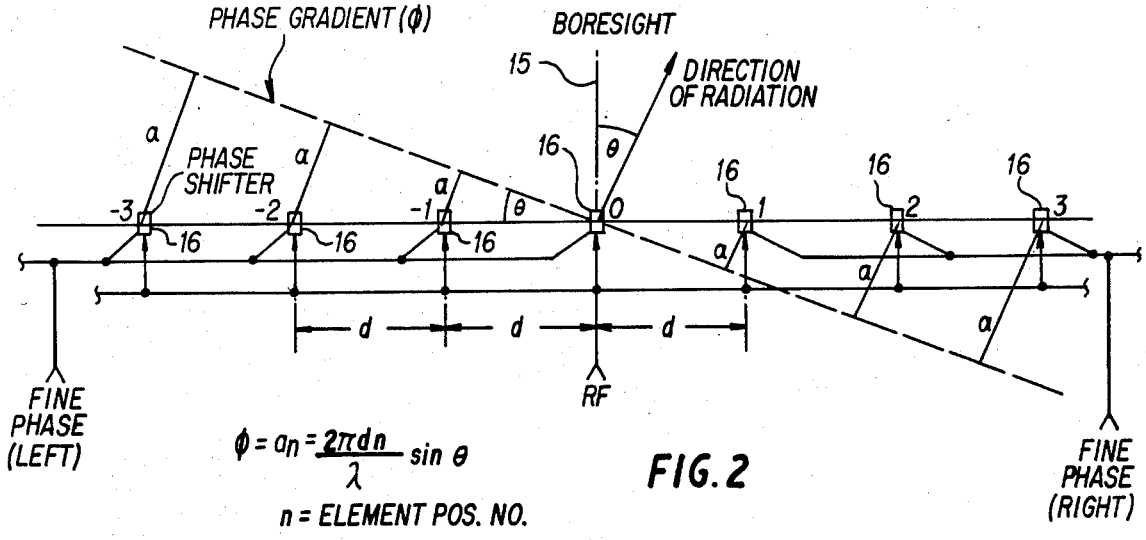
FIG. 2 is a diagram further illustrative of the phased array antenna shown in FIG. 1.

Referring now to the drawings, reference numeral 10 of FIG. 1 denotes a phased array antenna aperture including a plurality of uniformly spaced radiating elements 12 which generate a composite beam 14. The beam 14 defines a phase gradient $\phi$ as shown in FIG. 2 which is perpendicular to the direction of radiation. A beam pointing angle ($\theta$) offset from antenna boresight 15 is defined by the equation:

$$\theta = \arcsin \frac{\phi\lambda}{2\pi d} \tag{1}$$

where $\phi$ is the incremental phase between elements, $\lambda$ is the wavelength in air and d is the physical spacing between elements. This is furthermore shown diagrammatically in FIG. 2. This figure additionally discloses a plurality of phase shifters 16 which couple RF energy to respective radiating elements 12 as shown in FIG. 1. The phase shifters are further divided into a left and right side set 18 and 20. The two sets of phase shifters 18 and 20 are coupled to and receive RF energy from a series center fed power divider 22. The power divider 22 comprises a dielectrically loaded stripline power divider and is fed RF energy from a power amplifier 24 coupled to the output of an RF signal source 26 which is operable at a selected one of a plurality of operating frequencies f consisting of, for example, 200 discrete channel frequencies within a portion of the C band of the electromagnetic spectrum.

The steering angle $\theta$ of composite beam is controlled by a beam steering unit 28 which generates left and right fine phase command signals, as will be subsequently explained, which are coupled to the left and right side phase shifters 18 and 20 at regular intervals in a predefined sequence of individual phase shifters.

The phase gradient $\phi$ for any steering angle $\theta$ can be defined by solving equation (1) for $\phi$, or $$\phi = \frac{2\pi d}{\lambda} \times \sin\theta \tag{2}$$

If it is assumed that $\phi$ and $\lambda$ are invariant versus temperature, then $\theta$ is dependent on variations of element spacing d (FIG. 2) with temperature and d can be expressed as:

$$d=d[1+e(T-20)] \quad (3)$$

where d is the nominal spacing at the standard temperature (typically 20° C.), e is the coefficient of expansion in inch/inch/°C., and T is the temperature expressed in degrees centigrade. It is known, however, that phase gradient $\phi$ does change as a function of temperature. For a series center-fed power divider, a V-shaped gradient 14' results across the array as shown in FIG. 1. By substituting equation (3) into equation (1) and (2), and referencing the result to $\phi$ as computed at 20° C., an expression for the error $\Delta\theta$ as a function of temperature results which can be expressed as:

$$\theta = \arcsin\left[\frac{\sin\theta_{20}}{1+e(T-20)}\right] - \theta_{20} \quad (4)$$

where $\theta_{20}$ is the beam pointing angle at 20° C.

Figure 3:
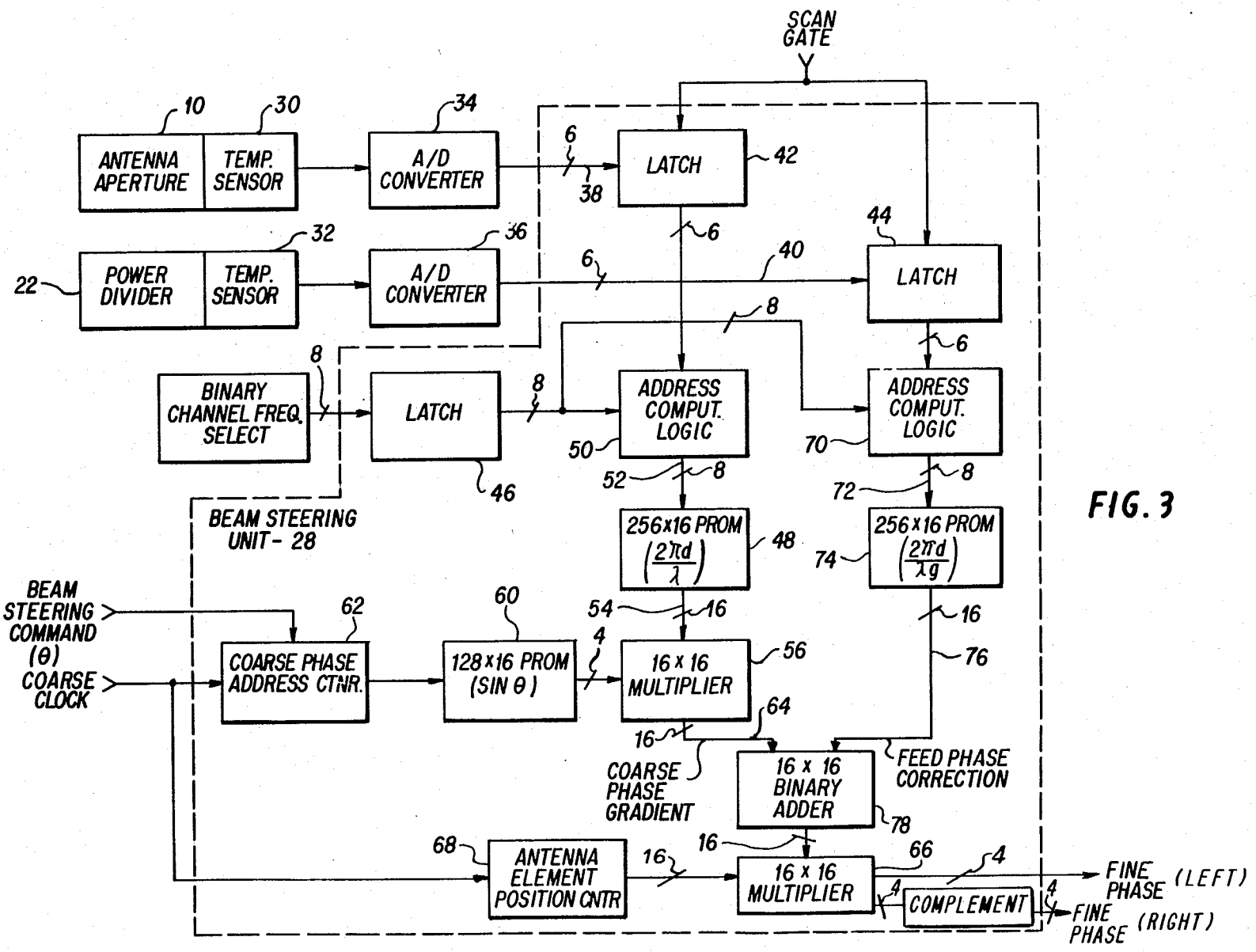
FIG. 3 is a block diagram further illustrative of the beam steering unit shown in FIG. 1.

This now leads to a consideration of the inventive concept of the subject invention wherein it is desired to compensate for any change in phase gradient with respect to temperature caused by both the antenna aperture 10 and the power divider 22 for a particular operating frequency. This involves adding a separate temperature sensor 20 and 32, respectively, to the physical structures of the antenna aperture 10 and the power divider 22. Both temperature sensors are operable to generate an analog electrical output signal which is fed to respective analog to digital (A/D) converters 34 and 36 which generate prescaled and quantized digital words which are used as inputs to the beam steering unit (BSU) 28. As shown in FIG. 3, the BSU 28 includes digital means for generating phase shifter drive signals which are applied one at a time to each of the phase shifters 16 in a predetermined sequence.

The compensation scheme involves the following consideration. If one examines equation (2) and rewrites it with d as a function of temperature normalized to 20° C. and replaces $\lambda$ by c/f, where c is the velocity of propagation and f is the operating frequency, the expression for the phase gradient $\phi$ can be expressed as:

$$\phi = \frac{2\pi df}{c}[1 - e(T-20)] \quad (5)$$

Expressed in this form, all terms are constant except f and T. Compensation accordingly comprises the selection of a proper set of beam steering gradients for a particular operating frequency or channel and sensed temperature and involves generating an address or pointer to a programmed digital memory which will now be explained.

Beam steering is accomplished by a method which is known as the COARSE/FINE scanning technique. With this technique, the steering phase for each antenna element 12 is calculated at discrete steps known as the coarse scan step. These phases are then applied at regular intervals to symmetrically located phase shifter pairs 16 as shown in FIGS. 1 and 2 according to a predefined sequence. Each pair of phase shifters in turn causes the beam 14 to move a fraction of the coarse scan step, and is known as the fine scan step.

Referring now to FIG. 3, disclosed there are the details of the beam steering unit 28. It comprises a digital compiler wherein analog voltages representative of each temperature i.e. of the antenna aperture 10 and power divider are preconditioned, and digitized through analog to digital converters 34 and 36 which generate 6-bit digital outputs. These digital temperature values are fed via data buses 38 and 40 to digital data latches 42 and 44 where the binary values are temporarily stored and updated periodically under the control of the scan gate control signal applied from a source, not shown. The channel RF frequency selected by the operator is also fed as an 8-bit binary word to a data latch 46. Both the quantized temperature and channel frequency data are thus both latched at the start of an angular guidance scan interval.

Disregarding feed phase correction for the present, the steering phase gradient $\phi$ for a beam pointing angle $\theta$ degrees from boresight 15, as shown in FIG. 2, can be expressed as equation (5) above. By lumping constants, equation (5) can be rewritten as:

$$\phi=K \sin\theta f[1-e(T-20°\text{ C.})] \quad (6)$$

where $\theta$ is steering angle, f is operating frequency and T is temperature in degrees centigrade. Therefore, $$\phi=F(f, T) \quad (7)$$

The determination of the coarse phase gradient can thus be calculated as a function of both frequency and temperature. This can be realized in view of the foregoing considerations. An uncompensated increase in frequency over some nominal values produces a pointing error in the same direction as that caused by an increase in the antenna aperture temperature over a given ambient temperature value. By inverting the analog temperature and prescaling the amplitude prior to digitizing, the quantized temperature may be directly added to the binary channel address forming an effective address or pointer that locates the coarse phase gradient value that satisfies the frequency and temperature parameters by effecting a shift in frequency or $\lambda$. Accordingly, the beam steering unit 28 includes a first PROM 48 which includes stored values of the term $2\pi d/\lambda$ which are read out in response to an 8-bit address pointer generated by an address computational logic block 50 and applied thereto via the digital data bus 52. The logic block 50 basically comprises a binary adder which sums the binary values of the temperature and frequency temporarily stored in the latches 42 and 46. The following Table A is illustrative of three resulting addresses for three different channel frequencies and three different temperatures, although it is possible for different frequencies and temperatures to provide the same coarse phase gradient address as shown in Table B.

TABLE A

| FREQ. | + | | TEMP. = | COARSE PHASE |
|---|---|---|---|---|
| Channel # | Dig. Addr. | °C. | Dig. Value | Gradient Addr. |
| 0 | 00000000 | 0 | 011100 | 00011100 |
| 4 | 00000100 | 20 | 010100 | 00110000 |
| 20 | 00010100 | 40 | 001100 | 00100000 |

TABLE B

| FREQ. | + | | TEMP. = | COARSE PHASE |
|---|---|---|---|---|
| Channel # | Dig. Addr. | °C. | Dig. Value | Gradient Addr. |
| 0 | 00000000 | +20 | 010100 | 00010100 |
| 4 | 00000100 | +30 | 010000 | 00010100 |

TABLE B-continued

| FREQ. Channel # | + Dig. Addr. | °C. | TEMP. = Dig. Value | COARSE PHASE Gradient Addr. |
|---|---|---|---|---|
| 20 | 00010100 | +70 | 000000 | 00010100 |

Figure 4A:
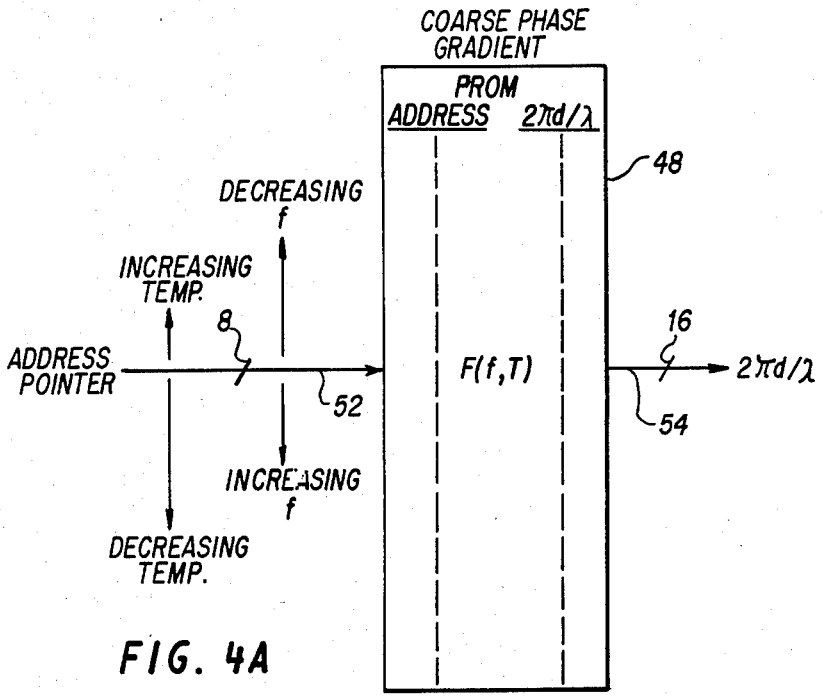
FIGS. 4A and 4B are diagrammatic illustrations of the programmable read only memories utilized in the beam steering unit shown in FIG. 3 for providing respective outputs for determining coarse phase gradients and feed phase corrections.
Figure 4B:
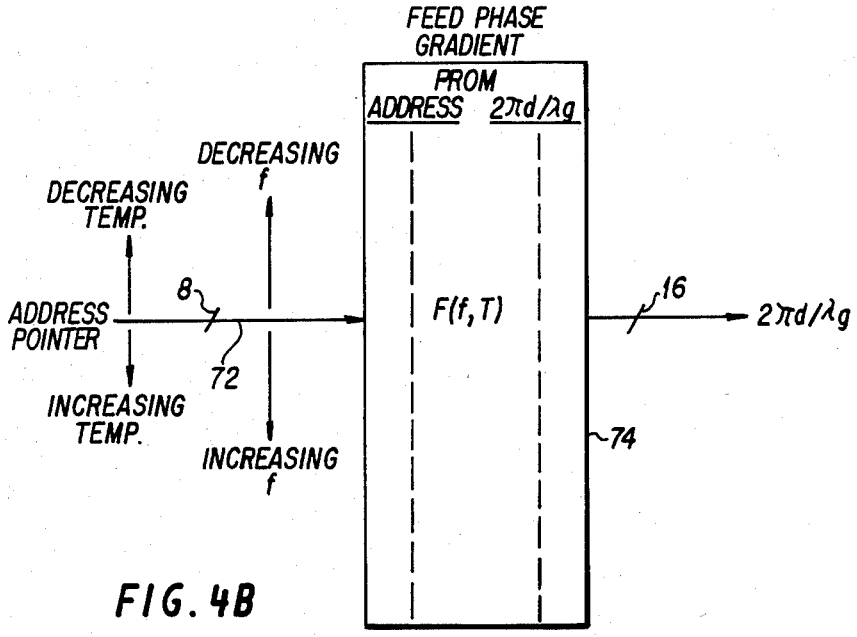

The PROM 48 is programmed to satisfy the function $\phi = F(f,T)$ for all of the required combinations of the frequency and temperature variables. Accordingly, a digital word corresponding to the value $2\pi d/\lambda$ is outputted for a particular memory address which is a function of temperature (−50° C. to +70° C.) and frequency (200 channels). Furthermore, as shown in FIG. 4A, the address pointer has a lower address number for increasing temperature, and decreasing frequency. A 16-bit binary output from the PROM 48 is fed via a 16-bit data bus 54 to a digital multiplier 56 which receives a 16-bit word from data bus 58 from a second PROM 60 which has a set of sin $\theta$ values stored therein for a plurality of beam steering command angles $\theta$ and which is fed to an address counter 62 under the control of a coarse clock input from a source, not shown. The multiplier 56 provides a 16-bit $(2\pi d/\lambda)$ sin $\theta$ output signal in accordance with equation (2) on data bus 64 which comprises a compensated coarse phase gradient control signal for the phase shifters 16 shown in FIG. 2. In absence of any feed phase correction, the coarse phase gradient signal on data bus 64 is applied to a digital multiplier 66 where an element position number is multiplied therewith from an input from an antenna element position counter 68. The output of the multiplier is rounded to a 4-bit digital word (MSB=180°) corresponding to the fine phase drive signals applied to the appropriate phase shifter 16 in accordance with the sequence established. Thus each phase shifter pair receives its appropriate fine phase drive signal in turn with the fine phase received by a particular phase shifter being the 2's complement of the fine phase received by its symmetrically located mate.

In order to also provide for feed phase correction, the digital 6-bit temperature value of the power divider 22 temporarily stored in the latch 44 is fed to an address computational logic block 70 along with the 8-bit binary address of the operator selected channel frequency which is temporarily stored in the latch 46. The two binary values stored in the latches 44 and 46 are summed together in logic block 70 in the same fashion as shown in Table A to generate a feed phase correction address which appears as an 8-bit signal on data bus 72 for addressing a third PROM 74 which has a set of stored values of the term $2\pi d/\lambda_g$ where $\lambda_g$ is the wavelength in the series-fed power divider and which can be expressed by the equation:

$$\lambda_g = \frac{\lambda_0}{\sqrt{E}}$$

where $\lambda_0$ is free space wavelength and E is the dielectric constant of the stripline dielectric.

The PROM 74 is similar to that of PROM 48 with the exception that a lower address is generated for decreasing frequency. A 16-bit digital word is fed out on the digital bus 76 where both the coarse phase gradient and the feed phase correction values are summed together in a binary adder 78. The output of the adder 78 is fed to the element position multiplier 66 whereupon the combined value of the coarse phase gradient and the feed phase correction is multiplied by the element position number to provide the respective fine phase drive signal for the appropriate phase shifter 16.

Thus what has been shown is a beam steering unit 28 which fetches digitized steering phase gradients and feed phase correction data from a pair of non-volatile memory storage units which are used to generate fine phase drive signals for a phased array antenna that is now compensated for with respect to both temperature and frequency.

Having thus shown and described what is at present considered to be the preferred embodiment of the invention, it should be noted that the same has been made by way of illustration and not limitation. Accordingly, all modifications, alterations and changes coming within the spirit and scope of the invention are herein meant to be included.

We claim:

1. A method of electronically compensating for beam pointing errors and sidelobes resulting from temperature and frequency changes on a phased array antenna including a set of phase shifters for controlling the beam radiated from a plurality of radiating elements comprising the steps of:

sensing temperature at least of the antenna aperture;

selecting an operating frequency from a plurality of discrete operating frequencies for RF signals transmitted from the array;

converting the sensed temperature of the antenna aperture to an electrical signal;

generating an electrical signal indicative of said operating frequency;

combining both electrical signals and generating therefrom a memory address signal;

addressing a memory having a set of stored values of beam steering phase gradients compensated for both temperature and operating frequency;

reading out a predetermined phase gradient value from said memory in accordance with said memory address signal;

generating a beam steering angle command signal;

operating on the predetermined value of the phase gradient read out from the memory by a mathematical function of beam steering angle and generating therefrom a coarse phase gradient signal;

utilizing said phase gradient signal as a phase shifter drive signal; and coupling said drive signal to said set of phase shifters for radiating a compensated beam from said array at said beam steering angle.

2. The method as defined by claim 1 and additionally including the step of multiplying the phase gradient signal by a number corresponding to element position on the array and generating thereby a fine phase signal and thereafter utilizing said fine phase signal as said phase shifter drive signal.

3. The method as defined by claim 2 wherein said memory comprises a digital memory, wherein said step of converting said sensed temperature to an electrical signal comprises converting the temperature signal to a digital temperature signal, wherein said step of generating an electrical signal indicative of the operating frequency comprises the step of generating a digital frequency signal, and wherein said step of combining both electrical signals comprises summing the digital temperature and frequency signals and generating thereby a digital memory address signal or pointer for said digital memory.

4. The method as defined by claim 3 wherein said digital memory includes a set of stored values of the term $2\pi d/\lambda$, where d is the separation between the radiating elements and $\lambda$ is inversely proportional to frequency, and wherein said function of the beam steering angle comprises the function sin $\theta$, where $\theta$ is the beam steering angle.

5. The method as defined by claim 1 wherein said phase shifters and said radiating elements receive RF energy of a selected operating frequency by way of a power divider and additionally including the further steps of:

sensing the temperature of the power divider;

converting the sensed temperature of the power divider to an electrical signal;

combining the power divider temperature signal with the operating frequency signal and generating therefrom another memory address signal;

addressing another memory, said another memory having a set of stored values of feed phase corrections compensated for both temperature and operating frequency;

reading out a predetermined feed phase correction value from said another memory in accordance with said another memory address signal;

combining said predetermined phase gradient value and said predetermined feed phase correction value into a composite signal; and utilizing said composite signal as said phase shifter drive signal.

6. The method as defined by claim 5 and additionally including the step of multiplying said composite signal by a number corresponding to a radiating element position and generating thereby a fine phase signal;

utilizing said fine phase signal as said phase shifter drive signal; and wherein said step of coupling said drive signal to said set of phase shifters comprises coupling said fine phase signal to said set of phase shifters in a predetermined sequence.

7. The method as defined by claim 6 wherein said converting steps comprise converting the respective electrical signals to digital signals, said memories comprise digital memories respectively storing digital values of phase gradients and feed phase corrections, and wherein said combining steps include generating respective digital memory address signals for addressing said digital memories.

8. The method as defined by claim 7 wherein said set of stored values of beam steering phase gradients comprises a set of digital values of the term $2\pi d/\lambda$ where d is the spacing between said radiating elements, and $\lambda$ is proportional to frequency, and wherein said set of stored values of feed phase corrections comprises a set of digital values of the term $2\pi d/\lambda_g$ where d also comprises the spacing between said radiating elements and $\lambda_g$ is the wavelength of energy propagating in said power divider, and said function of the beam steering angle comprises the function sin $\theta$ where $\theta$ is the beam steering angle.

9. The method as defined by claim 7 wherein said combining steps comprise the steps of summing the digital signals indicative of aperture temperature and operating frequency to generate a first digital memory address signal and summing the digital signal indicative of power divider temperature and operating frequency to generate a second digital memory address signal.

10. Apparatus for electronically compensating for beam pointing errors and sidelobes resulting from temperature and frequency changes on a phased array antenna comprising:

a linear array of a plurality of equally spaced radiating elements including a mechanical aperture;

a set of phase shifters coupled to said radiating elements for controlling the phase of RF energy radiated from respective elements and generating a composite radiated beam having a phased radiant thereacross;

a power divider for coupling RF energy of a predetermined operational frequency to said phase shifters from a common source;

means for sensing the temperature at least of said antenna aperture;

means for converting the sensed antenna aperture temperature to an electrical temperature signal;

means for selecting one of a plurality of operating channel frequencies of RF energy radiated from the radiating elements;

means for generating an electrical frequency signal of the selected channel frequency;

means for combining both electrical temperature signal and the electrical frequency signals and generating therefrom a memory address signal;

a memory including a set of stored values of beam steering phase gradients compensated for both aperture temperature and operating frequency, said memory address signal reading out a predetermined value of phase gradient from said digital memory;

means for generating a beam steering angle command signal;

means for multiplying the predetermined value of the beam steering phase gradient read out from said memory by the sine function of the beam steering angle to generate a coarse phase gradient signal;

means for multiplying the coarse phase gradient signal by a number corresponding to element position and generating thereby a fine phase signal; and means for coupling said fine phase signal to said set of phase shifters in a predetermined sequence for radiating a compensated beam from said array at said beam steering angle.

11. The apparatus as defined by claim 10 wherein said memory comprises a digital memory including a set of addressably stored digital values of phase gradients.

12. The apparatus as defined by claim 11 wherein said electrical temperature and frequency signals comprise digital signals and wherein said means for combining both said signals for generating a memory address signal comprises an address computational logic circuit which is operable to add said digital signals.

13. The apparatus as defined by claim 12 wherein said digital memory includes a set of stored values of the term $2\pi d/\lambda$, where d is the spacing between radiating elements, and $\lambda$ is a function of the frequency of the RF signal radiated from said elements.

14. Apparatus for electronically compensating for beam pointing errors and sidelobes resulting from temperature and frequency changes on a phased array antenna fed RF energy of a predetermined operating frequency selected from a plurality of operating channel frequencies comprising:

a plurality of equally spaced radiating elements arranged in a linear array and driven by a plurality of phase shifters, one for each element;

a power divider coupling a common source of RF energy of said predetermined operating frequency to each phase shifter;

means for sensing the temperature of said antenna;

first converting means for converting the sensed temperature to a first electrical temperature signal;

means for sensing the temperature of said power divider;

second converting means for converting the sensed temperature of said power divider to a second electrical temperature signal;

means for generating an electrical signal indicative of said operating frequency;

first signal combining means for combining said first electrical temperature signal and said electrical signal indicative of the operating frequency and generating a first memory address signal;

second signal combining means for combining said second electrical temperature signal and said electrical signal indicative of the operating frequency and generating second memory address signals;

a first memory responsive to said first memory address signal and having a set of retrievably stored values of beam steering phase gradients compensated for both temperature and operating frequency and providing a predetermined phase gradient value output signal in response to a particular first memory address signal;

a second memory responsive to said second memory address signal and having a set of retrievably stored values of feed phase corrections compensated for both temperature and operating frequency and providing a predetermined feed phase correction value output signal in response to a particular second memory address signal;

means for generating a beam steering angle command signal;

means for operating on the predetermined phase gradient value from said first memory by a function of the beam steering angle to generate a coarse phase gradient signal;

means for combining the coarse phase gradient signal and the predetermined phase correction signal provided by said second memory to provide a composite drive signal;

said composite signal being utilized to drive said phase shifters for radiating a compensated beam from said array at said beam steering angle.

15. The apparatus as defined by claim 14 and additionally including means for multiplying said composite signal by a number corresponding to each element position of said array and generating thereby a fine phase signal, said fine phase signal being coupled to each phase shifter in a predetermined sequence according to element position.

16. The apparatus as defined by claim 15 wherein said array comprises a series-fed array and wherein said phase shifters comprise a first set of phase shifters for one half of said radiating elements and a second set of phase shifters for the other half of the radiating elements and wherein said fine phase signal is applied to the respective phase shifter of said first and second sets of phase shifters in the same sequence.

17. The apparatus as defined by claim 15 wherein said first and second memory address signals comprise digital address signal pointers, said first and second memories being comprised of digital memories and being responsive to said digital address signal pointers to provide digital output signals of said phase gradients and feed phase corrections.

18. The apparatus as defined by claim 17 wherein said function of the beam steering angle comprises the sine function.

19. The apparatus as defined by claim 18 wherein said first digital memory includes a set of stored values of the term $2\pi d/\lambda$, where d is a measure of the physical separation between radiating elements, and $\lambda$ is inversely proportional to frequency, and wherein said second digital memory includes a set of stored values of the term $2\pi d/\lambda_g$ where d is also said separation between radiating elements and $\lambda_g$ is inversely proportional to the frequency of RF energy propagating in said power divider.

20. The apparatus as defined by claim 17 and additionally including a first temporary memory coupled from said first converting means to said first combining means for temporarily storing said first electrical temperature signal, a second temporary memory coupled from said means generating said operating frequency signal to said first and second combining means for temporarily storing said operating frequency signal, and a third temporary memory coupled from said second converting means to said second combining means for temporarily storing said second electrical temperature signal, said temporary memories being operable to periodically couple the respectively stored electrical signals of temperature and operating frequency to said first and second combining means.

21. The apparatus as defined by claim 20 wherein said first and second combining means are comprised of digital address computational logic means.

* * * * *